United States Patent [19]

Bourcier de Carbon

[11] 4,274,515
[45] Jun. 23, 1981

[54] SHOCK ABSORBER

[76] Inventor: Christian Bourcier de Carbon, 64, Boulevard Maurice-Barres, 92, Neuilly-sur-Seine, France

[21] Appl. No.: 24,715

[22] Filed: Mar. 28, 1979

[30] Foreign Application Priority Data

Mar. 29, 1978 [FR] France ................. 78 09031

[51] Int. Cl.³ ............................ F16F 9/06; F16F 9/40
[52] U.S. Cl. ..................... 188/269; 188/284; 267/8 R; 267/126
[58] Field of Search ............... 188/269, 284, 322, 271; 267/64 R, 124, 126, 8 R

[56] References Cited

U.S. PATENT DOCUMENTS

| | | | |
|---|---|---|---|
| 2,599,477 | 6/1952 | Patriquin | 188/284 |
| 2,721,074 | 10/1955 | de Carbon | 188/269 X |
| 2,729,308 | 1/1956 | Koski et al. | 188/284 |
| 2,774,446 | 12/1956 | de Carbon | 188/269 |
| 2,823,915 | 2/1958 | de Carbon | 188/269 X |
| 3,486,590 | 12/1969 | Peddinghaus | 188/269 |
| 3,904,002 | 9/1975 | Adrian et al. | 188/269 |

FOREIGN PATENT DOCUMENTS

| | | | |
|---|---|---|---|
| 1194716 | 6/1965 | Fed. Rep. of Germany | 188/269 |
| 2157857 | 5/1972 | Fed. Rep. of Germany | 188/322 |
| 1369285 | 6/1964 | France | 188/269 |
| 941330 | 11/1963 | United Kingdom | 188/322 |

Primary Examiner—George E. A. Halvosa
Attorney, Agent, or Firm—Watson, Cole, Grindle & Watson

[57] ABSTRACT

A shock absorber of the hydraulic-pneumatic type includes a cylindrical casing closed at both ends and partially filled with a liquid damping medium. A piston is reciprocable in the casing, has valve controlled passages and a piston rod thereon extending outwardly through a packed opening in one of the ends. A quantity of gaseous fluid under super-atmospheric pressure occupies the space above the level of the liquid, and a perforated partition forming an anti-splash device is disposed slightly below the liquid level. The partition is stationary in the casing and is frictionally held in place against the inner surface of the casing but is displaceable under the effect of a force greater than that applied to it by the movement of the shock absorber as a whole or of the liquid damping medium upon reciprocation of the piston.

9 Claims, 7 Drawing Figures

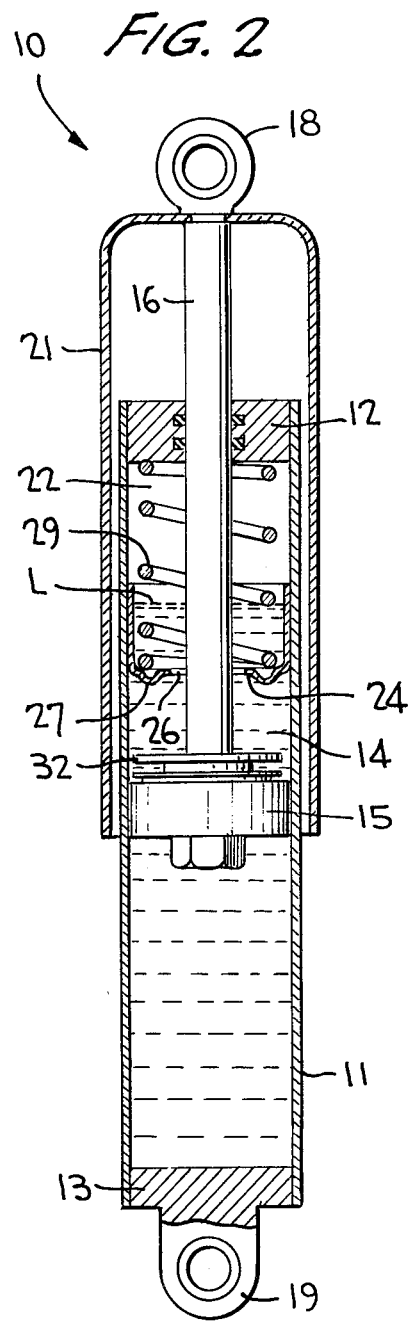
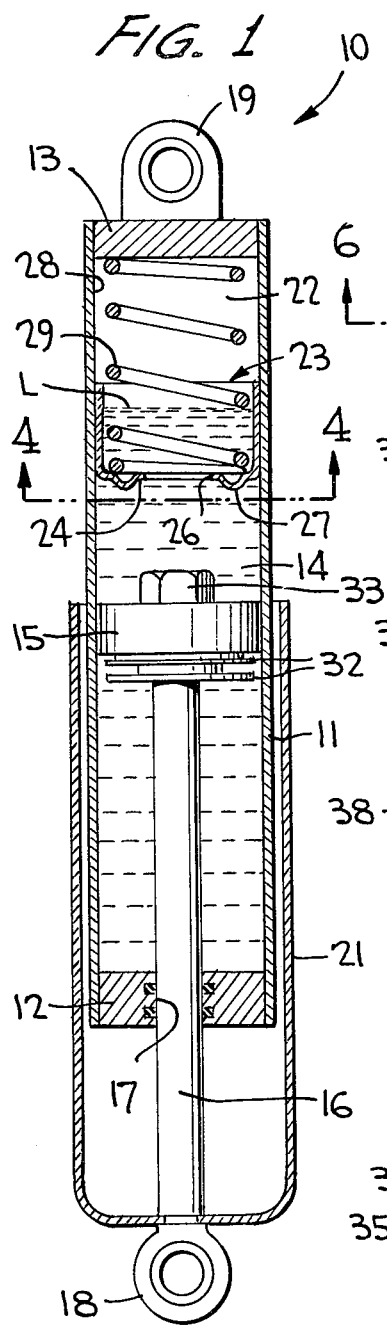
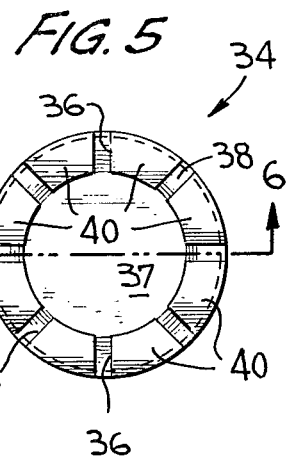
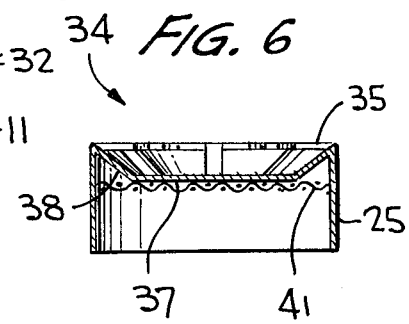
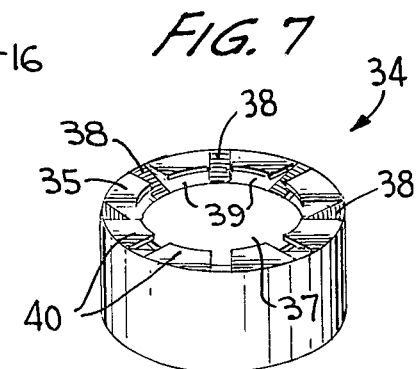
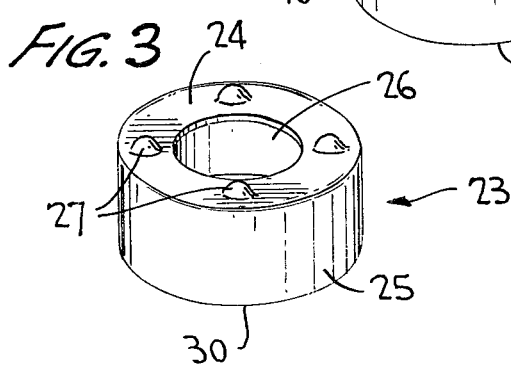
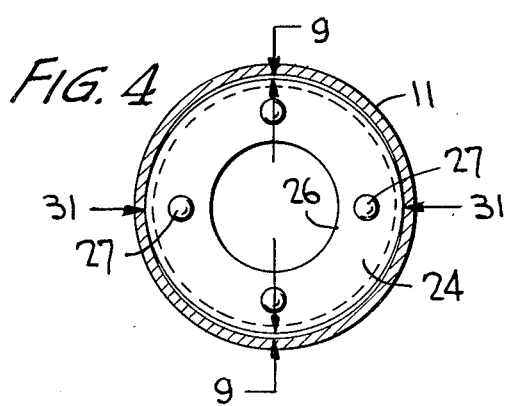

SHOCK ABSORBER

BACKGROUND OF THE INVENTION

This invention relates generally to a shock absorber of the hydraulic-pneumatic type, and more particularly to such a shock absorber having a stationary anti-splash device frictionally held in place against the inner surface of the shock absorber casing but being displaceable only upon application of a force which exceeds that created by movement of the hydraulic damping medium during reciprocation of the piston.

Shock absorbers of the hydraulic-pneumatic type, as generally disclosed in my prior U.S. Pat. Nos. 2,721,074, 2,774,446 and 2,823,915, are primarily adapted for use in connection with vehicle wheel suspensions. These shock absorbers include a cylindrical casing closed at both ends and containing a liquid damping medium as well as a compressed gas. A piston having valve controlled passages is reciprocable in the casing via a piston rod extending from the piston outwardly through a packed opening in one of the ends. The free end of the piston rod and the opposite end of the casing have means thereon for connecting the shock absorber to the vehicle chassis and to the wheel or axle mounting of the vehicle. The casing of a shock absorber of this type is partially filled with a hydraulic liquid so as to make provision for containing a quantity of compressible gaseous fluid. One of the problems during operation of a shock absorber of the general type described herein occurs during the turbulence which takes place in the hydraulic liquid during piston reciprocation, which turbulence leads to the formation of an oil-gas emulsion which is harmful to the proper operation of the shock absorber.

The formation of such oil-gas emulsions have in the past been avoided by the provision of a floating piston in the shock absorber casing for separating the hydraulic liquid and the gaseous fluid. The shock absorber could thus be utilized with its piston rod extending outwardly either upwardly of the casing or downwardly thereof. However, shock absorbers of such type having a floating separating piston are expensive to manufacture and require extreme care in the assembly thereof. Moreover, such floating-piston shock absorbers are known to experience frequent breakdowns during their operation. And, the shock absorber casing must have an almost perfectly smooth inner surface since the slightest imperfection thereon will define a passage allowing gas molecules to pass into the oil. A high quality shock absorber casing is therefore required to be manufactured which only further increases the cost thereof.

In the aforementioned U.S. Pat. No. 2,823,915, the entirety of which is specifically incorporated herein by reference, the formation of an oil-gas emulsion is minimized by the provision of a perforated partition fixedly mounted to the inner surface of the casing at the upper portion thereof below the level of the liquid damping medium. Such a fixed partition functions as an anti-splash device which produces broken or interrupted jets, thus breaking up the mixture of oil and air during the turbulent movement of oil passing upwardly through the piston passages.

However, the partition must be disposed at a sufficiently low level below that of the oil for satisfactory operation insuring against the formation of an oil-gas emulsion. Thus, for a predetermined overall length of the shock absorber, the length of the piston stroke may need to be reduced so as to avoid any interference between the piston and the fixed partition. This may become a serious inconvenience. Otherwise the shock absorber would need to be lengthened to accommodate a predetermined piston stroke.

SUMMARY OF THE INVENTION

It is therefore an object of the present invention to improve upon the shock absorber of U.S. Pat. No. 2,823,915 by making it possible to dispose the partition at a sufficiently low level while at the same time avoiding any interference between the piston and the partition during the stroke of the piston.

Another object of this invention is to provide a shock absorber of the hydraulic-pneumatic type in which the anti-splash partition is stationary and is frictionally held in place on the inner surface of the shock absorber casing, but is displaceable under a force greater than that applied to it by movement of the oil during reciprocation of the piston, i.e., the partition is displaceable by only movement of the piston itself. Thus, the partition can be moved axially of the casing by the piston at the end of its inward stroke moving toward the partition. A full predetermined stroke for the shock absorber piston may therefore be maintained by the present arrangement while avoiding any oil-gas emulsion by reason of the low normal position of the anti-splash partition. Thus, the length of the piston stroke need not be reduced for a predetermined overall length of the shock absorber, and the shock absorber need not be lengthened to accommodate a predetermined piston stroke.

A further object of this invention is to provide such a shock absorber wherein the perforated partition, after having been displaced by the piston, is returned to its initial position by a spring having a return force which is greater than the friction force between the partition and the inner surface of the casing.

A still further object of the present invention is to provide such a shock absorber wherein the perforated partition forms the bottom wall of a cup-shaped element having a side wall with an oval-shaped rim which is deformable for frictionally maintaining the partition in place.

A still further object is to provide such a cup-shaped member for a hydraulic-pneumatic type shock absorber wherein the partition has a central opening defining the perforation of a diameter greater than forty percent more than that of the piston rod diameter.

A still further object of the present invention is to provide such a cup-shaped member having a partition with perforations formed in such a manner that the oil is caused to move beyond the partition along paths at angles to the longitudinal axis of the shock absorber.

Other objects, advantages and novel features of the invention will become more apparent from the following detailed description of the invention when taken in conjunction with the accompanying drawings.

BRIEF DESCRIPTION OF THE INVENTION

FIG. 1 is a diagrammatic showing in vertical section of the shock absorber according to the invention, with the piston rod extending below the shock absorber;

FIG. 2 is a view similar to FIG. 1 of a shock absorber according to the invention, with the piston rod extending above the shock absorber;

FIG. 3 is a detailed perspective view, at a slightly enlarged scale, of a cup-shaped element of FIGS. 1 and 2 and containing a perforated partition, the element being shown inverted for clarity;

FIG. 4 is a sectional view taken substantially along the line 4—4 of FIG. 1 and showing the cup-shaped element frictionally mounted in place;

FIG. 5 is a plan view of a modified cup-shaped element;

FIG. 6 is a sectional view taken substantially along the line 6—6 of FIG. 5; and FIG. 7 is a perspective view of the cup-shaped element of FIGS. 5 and 6.

DETAILED DESCRIPTION OF THE INVENTION

Turning now to the drawings wherein like reference characters refer to like and corresponding parts throughout the several views, a shock absorber of the hydraulic-pneumatic type is generally designated 10 in FIG. 1, and includes a cylindrical elongated casing 11 enclosing a cylindrical chamber and having opposite ends 12 and 13 thereof sealed closed. The casing is partially filled with a hydraulic liquid 14, such as oil, serving as a damping medium, and a piston 15 is disposed for reciprocation in the chamber.

A piston rod 16 extends from the piston outwardly through a packed opening 17 provided in end wall 12. Eyelets 18 and 19, or the like, the respectively provided at the free end of the piston rod and on end wall 13 for mounting the shock absorber between a vehicle wheel or axle mounting and a vehicle chassis. The FIG. 1 shock absorber is of the "shaft-below" type wherein the piston rod extends through bottom end wall 12. The exposed portion of the piston rod is protected against mud and other foreign substances during operation of the shock absorber by means of a cylindrical cover 21 mounted at the free end of the piston rod and movable therewith during its reciprocation.

A quantity of gaseous fluid under super-atmospheric pressure occupies a space 22, for the purpose and in the manner as that disclosed in the aforementioned U.S. Pat. No. 2,823,915 patent, above the level L of the hydraulic fluid 14. A cup-shaped element 23, shown in detail in FIG. 3, has a bottom wall 24 defining a perforated partition which is immersed below the level L of the hydraulic fluid. Element 23 further includes a cylindrical side wall 25 connected to the bottom wall. The partition has a central perforation or opening 26 therein, and a plurality of short projections 27, formed by embossments or dimples, extending outwardly of the outer surface of the bottom wall.

Bottom wall 24 defines an anti-splash partition in the form of a disc immersed in the hydraulic fluid and being provided with at least one perforation permitting passage of the piston rod therethrough (as shown in FIG. 2) as well as that of the hydraulic fluid. This partition is normally stationary and is frictionally held in place against inner surface 28 of casing 11, but displaceable.

The expression "partition normally stationary, but displaceable" must be understood to mean that only the movements of the hydraulic fluid or of the shock absorber as a whole are incapable of displacing element 23, although element 23 may be displaced by the piston 15 itself and will then return to its initial position of FIG. 1 under the action of a return spring 29. Various approaches are available for producing a perforated partition meeting this definition.

The invention involves one of these approaches for maintaining element 23 and its perforated partition in position solely by the force of pressure between element 23 and inner surface 28. One end of spring 29 is mounted on end wall 13, and its other end bears against the inner surface of wall 24. The spring has a return force greater than the frictional force between element 23 and inner surface 28 of the casing, so as to automatically return element 23 back to its initial position of FIG. 1 after having been displaced from such position. Perforated partition 24 may therefore be disposed below the level L of the hydraulic fluid, as low within the hydraulic fluid is necessary, without regard to the overall length of the shock absorber or the length of the piston stroke. Moreover, spring 29 may be dimensioned as desired and may constitute an end-of-stroke stop acting at a predetermined stroke length for cushioning the piston. It is known that many shock absorbers include a rubber plug or the like forming an end-of-stroke, stop to absorb shocks. However, such a plug is typically only several mm thick, while spring 29 can be 15 to 30 mm long for an average sized vehicle shock absorber, which therefore considerably increases the end-of-stroke absorption feature thereof.

Side wall 25 of cup 23 functions to guide perforated partition 24 during its displacement by piston 15 and during its return by the spring. In the relaxed position before being assembled in the shock absorber casing, outer rim 30 of wall 25 is permanently deformed into an oval shape (unillustrated for the purpose of clarity) wherein the difference in dimensions along the length of its major and minor axes is about 1 to 5 mm. After assembly within the casing the gaps g (see FIG. 4) between opposite sides of wall 25 and the inner surface of the casing will be about 1 to 3 mm each. For a metal cup of from 0.2 to 0.4 mm thick, it may be further manually deformed upon assembly by squeezing it together in the direction of arrows 31 (FIG. 4). The prior permanent deformation establishes a very precise frictional force between the cup and the casing. This force is designed to exceed the force exerted on the partition by the hydraulic damping medium during its movement upon reciprocation of the piston. And, this frictional force is less than the force of the piston 15 which may be moved into contact therewith during its reciprocation so that accordingly, the cup will be displaced against the force of spring 29 and will not interfere with the operation of the piston stroke.

Partition 24 may have perforations distributed over its surface similarly as that shown in U.S. Pat. No. 2,823,915. However, according to the invention, it is preferable especially in the FIG. 2 embodiment to have these perforations grouped together into a central opening 26. Indeed, the jets of hydraulic fluid emanating from the passages of the piston are spread along wall 28, so that the partition's efficiency will be improved when the perforations are joined together at the center as at 26. The diameter of hole 26 may vary within broad limits. However, it is preferable that the diameter be at least 40% greater than that of rod or shaft 16. Also, it should be pointed out that piston 15 is provided with axial passages therein, as in the ('915 patent), which are valved by means of valve discs 32 to control passage of the hydraulic liquid from one side to the other of the piston during its reciprocation.

Moreover, hole 26 is shown in FIG. 1 to be slightly greater than the size of bolt head 33 which is provided for securing the piston and piston rod together. Thus, the bolt head will extend into opening 26 during reciprocation of movement of the piston toward the cup. And, when the piston comes into contact with the perforated partition, a slight gap will be maintained between the cup and the piston by means of projections 27 so as to insure adequate passage between the piston and the cup for the oil.

The shock absorber of FIG. 2 is of the "shaft-over" type wherein the piston rod extends upwardly of the shock absorber. Otherwise, the shock absorbers of FIGS. 1 and 2 are the same, and the elements thereof have accordingly been identified by the same reference numerals. The only real difference is that piston rod 16 extends through perforation 26, and valve disc 32 bears against projections 27 at the end of the upstroke of the piston. The projections therefore provide adequate passage between the cup and the disc for the oil. Thus, a simple anti-splash partition of the invention avoids the difficulties of the prior art anti-splash partition, as well as the inconveniences and difficulties inherent in the floating piston of the type mentioned earlier. The inner surface of the casing therefore need not be carefully machined, and a shaft-above type, as well as a shaft-below type shock absorber is made possible with all the inherent advantages and none of the drawbacks of the prior art.

A modified cup-shaped element 34 is disclosed in FIGS. 5 to 7. As will be seen the perforations of the partition in this embodiment are arranged in such a manner that the hydraulic liquid cannot be moved therethrough along a path parallel to the longitudinal axis of the shock absorber, but are moved rather along a staggered path. This can be achieved in various ways by arranging the perforations such that when the oil is passed therethrough it is guided at a sharp angle to the axis of the shock absorber.

Bottom wall 35 of cup 34, forming a perforated partition, has a series of peripheral U-shaped cuts 36 (FIG. 5) formed therein so as to form a series of spaced tongues 40. These tongues all lie in a common horizontal plane and are formed by stamping or otherwise shifting the remainder of the bottom wall inwardly so that a central wall section 37 will lie in another horizontal plane. Flanges 38 interconnect section 37 with the peripheral edge of wall 35. Perforations 39 are thus formed between adjacent flanges 38, as clearly shown in FIG. 6. Thus, perforations 39 and tongues 40 cause the oil to pass through the perforated partition along a path other than parallel to the axis of the shock absorber. Cup 34 is particularly adapted for use with a shock absorber of the shaft-below type of FIG. 1 and is disposed within the casing similarly as cup 23 shown therein.

To insure easy passage of the oil through the cup, the space between horizontal planes containing tongues 35 and wall section 37 should be less than the thickness of bolt head 33. Thus, the top surface of the bolt head will bear against portion 37 at the end of the upstroke of the piston thereby providing a slight gap between the cup and the top surface of the piston for passage of the oil. Otherwise, projections such as 27 may be provided for the cup-shaped element 34.

And, it should be pointed out that spring 29 is not indispensible to the operation of the invention. In the absence of such spring, the perforated partition remains stationary in the position defined by the end of the piston's stroke. Moreover, a wire mesh screen 41, or the like, may be secured against bottom wall 35 within cup 34 (see FIG. 6) so as to additionally minimize formation of an oil-gas emulsion.

From the foregoing it can be seen that a maximum stroke can be maintained for the piston of the hydraulic-pneumatic type shock absorber while insuring good protection against oil-gas emulsion because of the low normal position of the anti-splash partition. In addition to the advantage offered by the spring in automatically returning the partition to its initial position, the spring provides an end-of-stroke thrust for the piston which can be efficacious. The partition is normally stationary in the casing solely by means of the force of friction between the partition and the casing.

Obviously, many modifications and variations of the present invention are made possible in the light of the above teachings. It is therefore to be understood that within the scope of the appended claims the invention may be practiced otherwise than as specifically described.

I claim:

1. In a shock absorber of the hydraulic-pneumatic type including a cylindrical casing enclosing a cylindrical chamber and having upper and lower ends thereof sealed closed, piston means disposed for reciprocation in said chamber, a piston rod extending from said piston means outwardly through a packed opening in one of said ends, said chamber being partially filled with a liquid damping medium, the level of said liquid being spaced below said upper end, said piston means being adapted to move in said damping liquid and dividing said chamber into two portions of reciprocally variable capacity, said piston means including a piston having valve controlled passages to facilitate passage of said liquid from one of said chamber portions to the other as said piston reciprocates, a quantity of gaseous fluid under superatmospheric pressure occupying the space above said liquid level, and means located in the vicinity of the boundary surface between said liquid and said gaseous fluid for minimizing any liquid-gas emulsion, the improvement wherein: said minimizing means comprising a cup-shaped anti-splash device including a partition having at least one opening therein, said partition being surrounded by a side wall of oval-shaped cross-section, said side wall being inwardly deformable along its major axis for effecting a frictional engagement between said device and said casing; said device at an initial position lying slightly below said level of said liquid damping medium and being frictionally mounted at a predetermined frictional force which exceeds the force exerted on said partition by said liquid damping medium during its movement upon reciprocation of said piston; said anti-splash device and said piston means being arranged relative to each other as to permit contact therebetween during reciprocation of said piston toward said device; said frictional force being less than the force exerted by said piston during its reciprocation; and said anti-splash device having means thereon extending outwardly of said partition for spacing said partition away from said piston during said contact between said device and said piston means; whereby flow of said liquid between opposite sides of said piston is unimpeded during reciprocation of said piston means against said anti-splash device, and whereby any oil-gas emulsion is avoided during piston reciprocation by reason of said device lying at said initial position below said liquid level, said partition remaining stationary in said casing during the movement of said liquid damping medium upon reciprocation of said piston, although said partition is displaceable upon impact by said piston during said reciprocation.

2. The shock absorber according to claim 1, wherein a return spring is disposed between said upper end and said anti-splash device for returning said device to its initial position after being displaced upon impact by said piston.

3. The shock absorber according to claim 1, wherein said one end comprises said upper end, said piston rod extending through said opening in said partition, said opening being of a size greater than the cross-section of said piston rod to facilitate movement of said liquid medium therethrough.

4. The shock absorber according to claim 3, wherein the size of said opening is more than 40% greater than the cross-section of said rod.

5. The shock absorber according to claim 1, wherein said partition has a plurality of openings therein and said device includes a wall section having openings therein staggered relative to said partition openings, whereby flow paths are defined for the liquid medium passing therethrough at angles to the longitudinal axis of said casing.

6. The shock absorber according to claim 5 wherein said partition forms the bottom wall of said device, said device facing upwardly in said casing, said bottom wall having a portion including a plurality of spaced peripheral tongues lying in a first plane, the remaining portion of said bottom wall being displaced from said tongues and including a central section lying in a second plane spaced inwardly of said first plane, said openings being defined by cutouts forming said tongues and by spaces between said tongues.

7. The shock absorber according to claim 6, wherein the piston is connected to said piston rod by means of a bolt having a head thickness greater than the space between said first and second planes, whereby the top surface of said bolt head bears against said central section at the end of the inward stroke of said piston and thereby maintains a passage for the liquid medium between said piston and said partition.

8. The shock absorber according to claim 5, wherein said extending means on said partition comprises said wall section which engages said piston means for maintaining said partition openings spaced from said piston during said contact between said device and said piston means.

9. The shock absorber according to claim 1, wherein said extending means or said partition comprise a plurality of projections engaging said piston means for maintaining said opening spaced from said piston during said contact between said device and said piston means.

* * * * *